United States Patent Office 2,793,107
Patented May 21, 1957

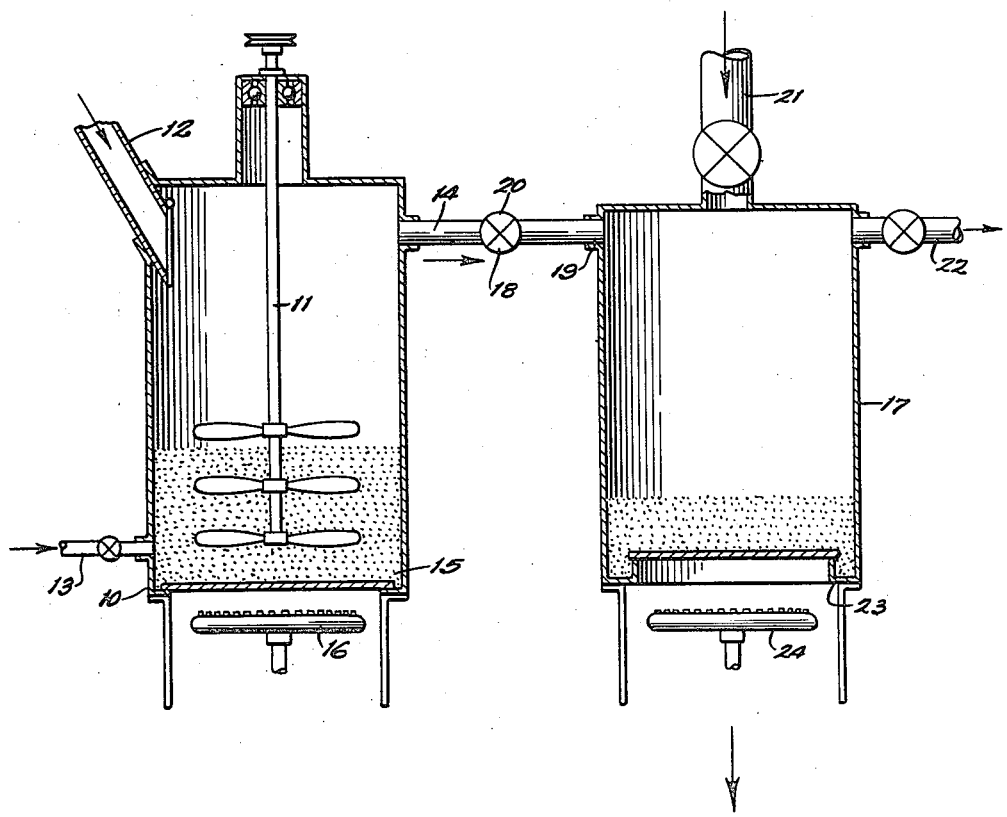

2,793,107

METHOD FOR SEPARATING ZIRCONIUM AND HAFNIUM FROM A COMMON SYSTEM

Stanislaw Teodor Jazwinski, Camp Hill, Pa., and Joseph A. Sisto, New York, N. Y., assignors to Barium Steel Corporation, New York, N. Y.

Application June 15, 1954, Serial No. 436,843

20 Claims. (Cl. 75—.5)

This invention relates to a method for the separation of zirconium and hafnium when present together in a metallic system and it relates more particularly to a process in which zirconium and hafnium may be separated substantially completely and cleanly one from the other with substantially complete recovery of each as a relatively pure material free from contamination by the other.

The separation of zirconium and hafnium, like the separation of other closely related metals one from the other, presents a very difficult problem, yet one constitutes an undesirable impurity which prevents many uses to be made of the other. As a result it is desirable to provide a means by which these elements may be separated one from the other in an economical and practical manner.

A number of techniques have heretofore been employed for their separation but the processes involved the use of expensive equipment and highly skilled labor and the processes are not only time consuming and laborious but the control of conditions to effect separation must be so exact as to render such processes impractical from a commercial standpoint.

It is an object of this invention to provide a new and improved process by which zirconium and hafnium may be separated at minimum expense and with a minimum expenditure of time, labor and materials, and in which substantially complete recovery of the respective elements is secured with the elements in a state of high purity for uses in applications not heretofore available and which may be employed in broadened usages where the more expensive metallic substances produced by the processes heretofore employed could not be adopted from the cost standpoint.

These and other objects and advantages will hereinafter appear and for purposes of illustration, but not of limitation, an embodiment of the invention is shown in the accompanying drawing in which—

Figure 1 is a schematic flow sheet illustrating the process of this invention.

Briefly described, the basis upon which separation is effected between hafnium and zirconium resides in the formation of compounds of the two elements by reaction under similar conditions but in which the compound that is formed of zirconium has a boiling point which differs sharply from the compound that is formed of hafnium and in which the compounds are sufficiently unstable at temperatures above their boiling points to enable reconversion to release the metallic components. Separation of zirconium from hafnium can be achieved by fractional distillation by heating the compounds above the boiling point for the compound of zirconium but below the boiling point of the compound of hafnium to distill off one from the other. Then the distillate in a separate container is heated to a temperature sufficient to cause molecular reconversion to release the metallic component of the separated compound. Separation of the one metal from the other may also be effected at the stage for reconversion by control of the temperature at which breakdown occurs so that one compound is broken down separate and apart from the other. Because reconversion reaction is achieved by an exothermic reaction, it is more difficult to maintain the desired temperature control for separation at this stage of the process and therefore it is preferred and it has been found possible to effect substantially complete separation of the compounds one from the other by fractional distillation of the thermally unstable compounds that are formed but at a temperature at which the compounds remain stable for substantially complete separation thereof.

It has been found that both zirconium and hafnium are capable of combining with carbon monoxide when heated together under pressure to a temperature at which the electrons become excited sufficiently to enable the molecules to regroup and form into a new compound by molecular association which is stable under the conditions existing to enable the compounds to be raised to their respective boiling points without disassociation of the compounds into their individual components.

The compounds which appear to be formed by reaction with carbon monoxide, when judged by their analysis and by the consumption of carbon monoxide, are believed to have the general formulae $Zr(CO)_7$ and $Hf(CO)_7$. Under the conditions of formation by what is believed to be a type of molecular association into the unstable compounds, these compounds exist in a liquid state in solution one with the other but in which the solution can be heated to the boiling points of the respective compounds. The boiling point of the compound formed of zirconium is a number of degrees lower than the boiling point of the compound formed of hafnium with the result that the compound formed of zirconium can be distilled off substantially completely from the compound formed of hafnium to effect their separation. When, after separation, the respective compounds are heated to a temperature where the compounds become unstable, believed to be about 50–100° above the boiling point for the respective compounds, molecular disassociation occurs to release the carbon monoxide as a gas while the metallic component is precipitated as a free powder of about atomic dimension.

By employing the new and novel steps of regrouping the elements to form new complex compounds, heating to the boiling points for the complex compounds to effect separation by distillation followed by reconversion of the separated compounds into their molecular components or, in the alternative, by regrouping to form the complex compounds, heating to boiling point to convert the compounds into vaporous state and then reconverting one compound into its separate components while maintaining the other as a vapor, zirconium can be substantially completely separated from hafnium to produce a metal which is substantially free of all usual contaminants.

Having set forth the theoretical concept upon which separation is based, description will now be made of the process for the separation of hafnium as an impurity of zirconium.

The zirconium containing hafnium as an impurity is first reduced to a finely divided state and introduced through an inlet 12 into a pressure vessel 10 having means, such as a burner 16, for heating the interior of the vessel to raise the temperature of the ingredients to the desired reaction stage. The vessel is formed with an inlet 13 in the lower end portion for admitting carbon monoxide into the vessel and also for the admission of other gases in the event that an inert gas is used in addition to carbon monoxide to maintain the desired pressure within the vessel. The lower end portion of the vessel is formed with a trap door or the like for extraction of the residue and an outlet 14 is provided in the upper portion of the vessel for passage of the vapors from the pressure vessel into a precipitation vessel 17 in communication therewith.

The charge 15 containing zirconium and hafnium in combination or in admixture, which is loaded into the pressure vessel, is preferably reduced to a finely divided state to reduce the time required for conversion to form the compounds $Zr(CO)_7$ and $Hf(CO)_7$, otherwise it would be necessary to form the compounds at the surface portions of the metal which then runs off as a liquid to expose the underlying portions for subsequent reaction. It is advisable to introduce a small amount of carbon in the form of activated carbon with the raw material to take up any oxygen which may be present as an oxide or in gaseous form and to convert such oxygen which is present into carbon monoxide. Additional carbon monoxide gas to provide an amount sufficient to react with the zirconium and hafnium in forming the complex compounds is introduced into the chamber and use may be made of carbon monoxide or an inert gas such as helium and argon to maintain the desired pressure level within the vessel for reaction.

For the present it has been found to be desirable to maintain pressure conditions within the vessel within the range of 2–10 atmospheres. At least 2 atmospheres pressure is believed to be necessary for reaction and to produce a compound which is stable while in a liquid state over a fairly wide temperature range. Pressures in excess of 10 atmospheres can be used but such increased pressures do not proportionally increase the rate of reaction to form the product and such increased pressures require the use of apparatus of greater wall thickness and strength thereby to limit the size and capacity of the apparatus used in the processes for separation of the metallic components.

At the preferred pressure of from 4–8 atmospheres, excellent yield has been secured of the complex compounds with a temperature of about 400° C. The compounds may be formed under the pressure conditions described at a lower temperature of about 300° C. but the rate of reaction begins to fall off markedly. It is undesirable to make use of temperatures in excess of 800° C. because thermal decomposition begins to take place notwithstanding the high pressure existing within the vessel. Under the conditions described, the materials are maintained in the pressure vessel for reaction and to accelerate the reaction the materials are agitated as by means of stirrers 11 until the major proportions of the metallic components have been converted to their respective liquid complex compounds. During reaction, the vessel is sealed for maintaining the desired pressure levels.

When the metallic substances within the chamber become depleted, the reaction rate becomes slowed as evidenced by the rate of consumption of carbon monoxide. Upon completion of the reaction, the pressure is released from the vessel and the materials are heated to a temperature slightly above the boiling point for $Zr(CO)_7$ but below the boiling point for the compound $Hf(CO)_7$. Such temperature conditions are maintained until the $Zr(CO)_7$ is distilled off from the $Hf(CO)_7$ and bled into the precipitation chamber through the conduit 18 in which the valve 20 is open for communication during vaporization. When the distillation for separation of the $Zr(CO)_7$ is complete, the valve 20 is closed and another valve in a conduit communicating the pressure vessel with a similar but separate precipitation chamber is opened and the temperature within the pressure vessel is raised to above the boiling point for the compound $Hf(CO)_7$ but below its thermal breakdown temperature. Thus the $Hf(CO)_7$ is distilled from the pressure vessel into the other precipitation chamber for reconversion to form the separate metals. The precipitation chambers are sealed off from the pressure vessel and the temperature in the respective precipitation vessels is raised to above the thermal breakdown temperature for each of the compounds. During molecular excitation at the elevated breakdown temperatures, the carbon monoxide is released as a gas and the zirconium and the hafnium components of the compounds in the separate precipitation vessels are reduced to a finely divided solid which collects as a powder in the bottom of the vessels.

Each of the precipitation vessels are formed with a burner 24 or other means for heating the vessel to the desired temperature levels. Inlets 21 are provided in the upper end portion having conduits communicating the inlets with a source of inert gas, such as helium or argon, for introduction into the precipitation vessels to purge the carbon monoxide which is released from the vessel through outlet openings 22.

Frequently it is desirable to make use of a number of precipitation vessels in communication one with the other to subject the exhaust gases to thermal break-down temperature for recovery of any compound which might remain in the exhausted gases in vaporous form.

As previously pointed out, instead of causing separation of the $Zr(CO)_7$ and $Hf(CO)_7$ from the pressure vessel by fractional distillation, the compounds within the pressure vessel may be heated together to a temperature above the boiling point temperature for $Hf(CO)_7$ but below the thermal break-down temperature for the compounds to distill both of the compounds simultaneously into a single precipitation vessel. The precipitation vessel is then sealed off and heated to a temperature sufficient to cause thermal break-down of the $Zr(CO)_7$ but insufficient to cause thermal break-down of $Hf(CO)_7$ whereby the former compound is reconverted to carbon monoxide gas and the zirconium is precipitated as a dust which collects on the bottom of the vessel. The carbon monoxide and the remaining vapor of $Hf(CO)_7$ is purged by the inert gas through the outlet opening into a second precipitation chamber where the temperature may be raised to a point above that for causing thermal break-down of the $Hf(CO)_7$ to release carbon monoxide and to precipitate hafnium as a fine powder which collects on the bottom of the second vessel.

This latter means for separation of the metals is more difficult to achieve because of the exothermic reaction which occurs upon thermal break-down thereby to cause the temperature within the vessel to rise, unless special precautions are taken to a point where thermal decomposition of the $Hf(CO)_7$ might occur simultaneously with the break-down of the $Zr(CO)_7$ in the first precipitation chamber. Best and most efficient separation is achieved by fractional distillation of the respective compounds into separate precipitation vessels from the pressure vessel in which the compounds are formed.

The carbon monoxide which is released upon thermal break-down of the complex compounds may be recycled after suitable purification and concentration for reuse in the pressure vessel in forming the complex. It will be apparent that the consumption of raw materials in the process described for the separation of zirconium and hafnium will be maintained at a minimum and that the cost of equipment and labor and fuel will be substantially less than that heretofore required for such separation processes.

It will be apparent also that the process described is capable of alignment in a unit operation for continuous production with the pressure vessel operating to form the complex compound concurrently with the operation of the precipitation vessels containing the vapors of the compounds previously formed to effect precipitation of the metallic component thereof.

When zirconium is present as a contaminant in hafnium, separation may be achieved in a similar manner as that described with even better yield and with even better separation since the amount of zirconium which is distilled off first is small by comparison with the hafnium compound which remains thereby to minimize the amount of the undesirable compound which can be carried off with the vapors of $Zr(CO)_7$. Other than the differences in amount, the temperature conditions for molecular association in conversion to form the compound, the temperatures for distillation and the temperatures for reconversion to release carbon monoxide and precipitate the compound as a powder in the respective precipitation vessels will be substantally the same.

As previously pointed out, the compounds that are formed are believed to have the formulae $Zr(CO)_7$ and $Hf(CO)_7$ and therefore use has been made of the formulae to identify the compounds in the specification and claims, but it will be understood that the compounds that are formed may have a different structure or arrangement.

It will be further understood that changes may be made in the details of construction, arrangement and operation of the apparatus and reasonable changes may be made in the temperature and pressure conditions described without departing from the spirit of the invention, especially as defined in the following claims.

We claim:

1. In the method of separating zirconium and hafnium when one is present in combination with the other in a metal, the steps of introducing the metal in finely divided form into a pressure chamber, introducing carbon monoxide into the chamber in amounts in excess of 7 mols of carbon monoxide to one atomic weight of the metal, heating the materials under pressure until molecular association occurs between the carbon monoxide and the metals to form compounds which are stable at boiling point temperature and slightly above but which are unstable at higher temperatures that cause molecular disassociation and in which the compound formed of zirconium has a lower boiling point than the compound formed of hafnium, heating the materials to a temperature above the boiling point for the compound formed of zirconium but below the boiling point for the compound formed of hafnium to distill off the zirconium compound from the remainder, and heating the compound which has been distilled off at a still higher temperature sufficient to cause molecular disassociation of the compound to release carbon monoxide as a gas and to precipitate the zirconium as a powder.

2. In the method of separating zirconium and hafnium when one is present in combination with the other, the steps of introducing the metal in a finely divided form into a pressure chamber, introducing carbon monoxide into the chamber in amounts at least sufficient to convert the metals into compounds having the general formula $Zr(CO)_7$ and $Hf(CO)_7$, heating the materials under pressure until molecular association occurs between the carbon monoxide and the metals to form the respective compounds which are stable at their boiling point temperatures and slightly above but which are unstable at higher temperatures and in which the $Zr(CO)_7$ has a boiling point which is lower than the compound $Hf(CO)_7$, heating the compounds to a temperature above the boiling point for $Zr(CO)_7$ but below the boiling point of the $Hf(CO)_7$ to distill off the zirconium compound from the remainder, heating the distillate at a higher temperature sufficient to cause disassociation of the compound to release carbon monoxide as a gas and to precipitate the zirconium as a powder.

3. In the method of separating zirconium and hafnium when one is present in combination with the other, the steps of introducing the metal in a finely divided form into a pressure chamber, introducing carbon monoxide into the chamber in amounts at least sufficient to convert the metals into compounds having the general formula $Zr(CO)_7$ and $Hf(CO)_7$, heating the materials under pressure until molecular association occurs between the carbon monoxide and the metals to form the respective compounds which are stable at their boiling point temperatures and slightly above but which are unstable at higher temperatures and in which the $Zr(CO)_7$ has a boiling point which is lower than the compound $Hf(CO)_7$, heating the compounds to a temperature above the boiling point for $Zr(CO)_7$ but below the boiling point of the $Hf(CO)_7$ to distill off the zirconium compound from the remainder, collecting the distillate in one container and then heating the remainder at a temperature above the boiling point for $Hf(CO)_7$ but below the temperature for thermal decomposition to distill off the $Hf(CO)_7$ into a separate container, and then heating the compounds within their respective containers at a temperature sufficient to cause molecular disassociation to release carbon monoxide as a gas and to precipitate the respective metallic components as a powder.

4. In the method of separating zirconium and hafnium when one is present in combination with the other, the steps of introducing the metal in finely divided form into a pressure chamber, introducing carbon monoxide into the chamber in amounts at least sufficient to convert the metals into compounds having the general formula $Zr(CO)_7$ and $Hf(CO)_7$, heating the materials while under a pressure of at least 2 atmospheres until molecular association occurs between the carbon monoxide and the metals to form the respective compounds which are stable at their boiling points but which are unstable at higher temperatures causing molecular disassociation and in which the $Zr(CO)_7$ has a lower boiling point than the $Hf(CO)_7$, heating the materials to a temperature above the boiling point for the compound formed of zirconium but below the boiling point for the compound formed of hafnium to distill off the zirconium compound from the remainder, and heating the compound which has been distilled off at a still higher temperature sufficient to cause molecular disassociation of the compound to release carbon monoxide as a gas and to precipitate the zirconium as a powder.

5. In the method of separating zirconium and hafnium when one is present in combination with the other, the steps of introducing the metal in finely divided form into a pressure chamber, introducing carbon monoxide into the chamber in amounts at least sufficient to convert the metals into a compound having the general formula $Zr(CO)_7$ and $Hf(CO)_7$, maintaining a pressure of at least 2 atmospheres within the chamber, and heating the materials under pressure to a temperature above 300° C. but below 800° C. to cause molecular association between the carbon monoxide and the metals to form the respective compounds, heating the compounds to a temperature above the boiling point for $Zr(CO)_7$ but below the boiling point for $Hf(CO)_7$ to distill off the zirconium compound from the remainder, collecting the distillate in a separate chamber, and heating the distillate to a higher temperature to cause molecular disassociation of the $Zr(CO)_7$ to release carbon monoxide as a gas and to precipitate the metallic components as a powder.

6. In the method of separating zirconium and hafnium when one is present in combination with the other, the steps of introducing the metal in finely divided form into a pressure chamber, introducing carbon monoxide into the chamber in amounts at least sufficient to convert the metals into a compound having the general formula $Zr(CO)_7$ and $Hf(CO)_7$, maintaining a pressure of at least 2 atmospheres within the chamber, and heating the materials under pressure to a temperature above 300° C. but below 800° C. to cause molecular association between the carbon monoxide and the metals to form the respective compounds, heating the compounds to a temperature above the boiling point for $Zr(CO)_7$ but below the boiling point for $Hf(CO)_7$ to distill off the zirconium compound from the remainder, collecting the distillate in a separate chamber, heating the distillate to a higher temperature to cause molecular disassociation of the $Zr(CO)_7$ to release carbon monoxide as a gas and to precipitate the metallic components as a powder, and heating the $Hf(CO)_7$ which remains in the pressure chamber to a temperature above the boiling point for the compound but below its thermal decomposition temperature to distill off the $Hf(CO)_7$ from the remainder, and then heating the distillate at a higher temperature to cause molecular disassociation of the $Hf(CO)_7$ to release carbon monoxide as a gas and to precipitate the hafnium as a powder.

7. In the method of separating zirconium and hafnium when one is present in combination with the other, the steps of introducing the metal in finely divided form into a pressure chamber, introducing carbon monoxide into the chamber in amounts at least sufficient to convert the metals into a compound having the general formula $Zr(CO)_7$ and $Hf(CO)_7$, maintaining a pressure of at least 2 atmospheres within the chamber and heating the materials under pressure to a temperature above 300° C. but below 800° C. to cause molecular association between the carbon monoxide and the metals to form the respective compounds, heating the compounds to a temperature above the boiling point for $Zr(CO)_7$ but below the boiling point for $Hf(CO)_7$ to distill off the zirconium compound from the remainder, collecting the distillate in a separate chamber, heating the distillate to a higher temperature to cause molecular disassociation of the $Zr(CO)_7$ to release carbon monoxide as a gas and to precipitate the metallic components as a powder, and heating the compound which remains to a temperature sufficient to cause molecular disassociation to release carbon monoxide as a gas and to precipitate the metallic components as a powder.

8. The method as claimed in claim 1 which includes the additional step of adding carbon in finely divided form with the metal into the pressure chamber in amounts sufficient to take up any available oxygen and convert it into carbon monoxide.

9. The method as claimed in claim 1 in which additional carbon monoxide is employed to maintain the pressure level within the pressure chamber.

10. The method as claimed in claim 1 in which an inert gas is introduced into the pressure chamber to maintain the desired pressure level.

11. The method as claimed in claim 1 in which the materials are agitated during reaction to form the compound by molecular association.

12. The method as claimed in claim 5 in which the compounds form stable liquids at the temperature and pressure conditions existing in the pressure chamber.

13. In the method of separating zirconium and hafnium when one is present in combination with the other, the steps of introducing the zirconium and hafnium in finely divided form into a pressure chamber, introducing carbon monoxide in the chamber in amounts at least sufficient to convert the zirconium and hafnium into a compound having the formula $Zr(CO)_7$ and $Hf(CO)_7$, heating the materials under pressure until molecular association occurs between the carbon monoxide and the metallic components to form the compound which is stable at boiling point and slightly above but which forms the compounds $Zr(CO)_7$ and $Hf(CO)_7$, heating the compounds to a temperature above their boiling points but below the thermal decomposition point of the compounds to distill off the compounds from the pressure chamber, heating the distillates to a temperature above the thermal instability of one compound but below the thermal break-down point of the other to disassociate the one compound to release carbon monoxide as a gas and precipitate its metallic component as a fine powder.

14. In the method of separating zirconium and hafnium when one is present in combination with the other, the steps of introducing the zirconium and hafnium in finely divided form into a pressure chamber, introducing carbon monoxide in the chamber in amounts at least sufficient to convert the zirconium and hafnium into a compound having the formula $Zr(CO)_7$ and $Hf(CO)_7$, heating the materials under pressure until molecular association occurs between the carbon monoxide and the metallic components to form the compound which is stable at boiling point and slightly above but which forms the compounds $Zr(CO)_7$ and $Hf(CO)_7$, heating the compounds to a temperature above their boiling points but below the thermal decomposition point of the compounds to distill off the compounds from the pressure chamber, heating the distillates to a temperature above the thermal instability of one compound but below the thermal breakdown point of the other to disassociate the one compound to release carbon monoxide as a gas and precipitate its metallic component as a fine powder, and removing the remaining vapors into a separate chamber, heating the vapors to a still higher temperature to cause break-down of the remaining compound to release carbon monoxide and to precipitate the metallic component as a fine powder.

15. In the method of separating zirconium and hafnium when present in combination as $Zr(CO)_7$ and $Hf(CO)_7$, the steps of heating the compounds to a temperature above the boiling point for the $Zr(CO)_7$ but below the boiling point for the $Hf(CO)_7$ to distill off the $Zr(CO)_7$ from the remainder, and then heating the distillate in a separate chamber to a temperature above its thermal break-down point to cause molecular disassociation for release of carbon monoxide as a gas and to precipitate the metallic compound as a fine powder.

16. In the method of separating zirconium and hafnium when one is present in combination with the other as $Zr(CO)_7$ and $Hf(CO)_7$, the steps of heating the compounds to a temperature above the boiling point for zirconium but below the boiling point for hafnium to distill off the compound from the remainder, collecting the distillate in one chamber, heating the remaining compound to above boiling point but below the thermal break-down point for the $Hf(CO)_7$ and collecting the distillate in another chamber, and heating the distillates in their respective chambers to a temperature above their thermal break-down point to cause molecular disassociation and release carbon monoxide as a gas and to precipitate the respective metallic components as a fine powder.

17. In the method of separating zirconium and hafnium when one is present in combination with the other, the steps of forming the compounds $Hf(CO)_7$ and $Zr(CO)_7$ by reaction of the hafnium and zirconium with carbon monoxide under heat and pressure, heating the compounds to a temperature above the boiling point for the $Zr(CO)_7$ but below the boiling point for the $Hf(CO)_7$ to distill off the zirconium compound from the remainder, and then heating the distillate at a temperature in excess of its thermal break-down point to cause molecular disassociation and release carbon monoxide as a gas and to precipitate the metallic component as a fine powder.

18. In the method of separating zirconium and hafnium when one is present in combination with the other, the steps of forming the compounds $Hf(CO)_7$ and $Zr(CO)_7$ by reaction of the hafnium and zirconium with carbon monoxide under heat and pressure, heating the compounds to a temperature above the boiling point for the $Zr(CO)_7$ but below the boiling point for the $Hf(CO)_7$ to distill off the zirconium compound from the remainder, heating the distillate at a temperature in excess of its thermal break-down point to cause molecular disassociation and release carbon monoxide as a gas and to precipitate the metallic component as a fine powder, and heating the $Hf(CO)_7$ to a temperature above its boiling point but below the thermal break-down temperature to distill the $Hf(CO)_7$ and then heating the distillate to a temperature above its thermal break-down point to cause molecular disassociation for release of carbon monoxide as a gas and to precipitate the metallic component as a fine powder.

19. In the method of separating zirconium and hafnium when one is present in combination with the other, the steps of forming the compounds $Hf(CO)_7$ and $Zr(CO)_7$ by reaction of the hafnium and zirconium with carbon monoxide under heat and pressure, heating the compounds to a temperature above the boiling point for the $Hf(CO)_7$ to distill off the $Zr(CO)_7$ and $Hf(CO)_7$ from the remainder, and then heating the distillate to a still higher temperature above the thermal break-down temperature for the $Zr(CO)_7$ but below the thermal break-down temperature for the $Hf(CO)_7$ whereby molecular disassociation of the $Zr(CO)_7$ occurs to release carbon monoxide and precipitate the metallic component as a powder.

20. In the method of separating zirconium and hafnium when one is present in combination with the other, the steps of forming the compounds $Hf(CO)_7$ and $Zr(CO)_7$ by reaction of the hafnium and zirconium with carbon monoxide under heat and pressure, heating the compounds to a temperature above the boiling point for the $Hf(CO)_7$ to distill off the $Zr(CO)_7$ and $Hf(CO)_7$ from the remainder, heating the distillate to a still higher temperature above the thermal break-down temperature for the $Zr(CO)_7$ but below the thermal break-down temperature for the $Hf(CO)_7$ whereby molecular disassociation of the $Zr(CO)_7$ occurs to release carbon monoxide and precipitate the metallic component as a powder, purging the remaining vapors into another chamber, and heating the vapors to a temperature in excess of the thermal break-down point for $Hf(CO)_7$ to cause molecular disassociation for release of carbon monoxide as a gas and to precipitate the metallic component as a fine powder.

References Cited in the file of this patent

UNITED STATES PATENTS 2,041,493   Schlect et al. _____ May 19, 1936

FOREIGN PATENTS 367,481   Great Britain _____ Feb. 25, 1932